Feb. 6, 1962  J. E. DRIANCOURT  3,020,054
SEALING RING FOR A PIPE JOINT AND THE
JOINT INCORPORATING THIS RING
Filed Feb. 19, 1958  2 Sheets-Sheet 1

United States Patent Office 3,020,054
Patented Feb. 6, 1962

3,020,054
SEALING RING FOR A PIPE JOINT AND THE JOINT INCORPORATING THIS RING
Jean Eugène Driancourt, Pont-a-Mousson, France, assignor to Compagnie de Pont-a-Mousson, Nancy, France, a French body corporate
Filed Feb. 19, 1958, Ser. No. 716,231
Claims priority, application France Feb. 21, 1957
1 Claim. (Cl. 277—170)

The present invention relates to sealing rings for the connection of pipes and like socket elements, and more particularly to sealing rings of the type comprising an annular body which is provided with a protuberance on its surface—generally in the form of a rib adapted to cooperate with a complementary portion of one of the pipes to be assembled so as to maintain the ring in position longitudinally of the pipe by anchoring the ring relative to the latter—and which is extended in the direction substantially parallel with its axis by two annular concentric lips adapted to be applied against the inner and outer walls of the respective pipes to be assembled.

In known sealing rings of this type, the lips correspond to at least half, and generally substantially three quarters of the axial width of the ring. Thus, the body of the ring is small and the lips are long and thin. These rings are therefore highly deformable with resultant serious disadvantages.

The ring is placed in position, before the joint is terminated, either on the male or spigot end of one of the pipes or in the socket or bell of the adjoining pipe so that its lips extend toward the inner end of the socket.

When placed on the male end, the circular shape of the ring is well conserved by the male end so that the ring does not tend to become oval or flattened owing to insufficient rigidity, even with respect to large diameters exceeding 500 mm. However, in the course of inserting the male end in the socket, the friction of the inner face of the socket on the thin outer lip tends to roll or push it back, which tends to impair the satisfactory application of this lip against the inner face of the socket and the effectiveness of the joint. The friction of the socket on the ring could push the latter along the male end away from the extremity of the latter if the anchoring means holding the ring in longitudinal position has an insufficient hold on the body of the ring owing to low resistance of this body. On the other hand, when the ring is put in position in the socket of one of the pipes before terminating the joint, this ring is not suitably maintained in circular form owing to its high flexibility. Thus, if it does not possess in itself a certain rigidity, there is some risk of its becoming flattened and oval under the effect of its own weight; this occurs in the case of large diameter pipes exceeding 500 mm. and renders insertion of the male end difficult and could even destroy the ring. Further, the penetration of the male end could push the ring toward the inner end of the socket due to the aforementioned reason.

In both cases, the automatic joint obtained, incorporating a sealing element having an elastic lip, has the advantage of permitting large angular deviations of one of the pipes relative to the other, on condition that a certain clearance is provided between the outer face of the male end or spigot and the inner face of the entrance of the socket or bell.

This clearance should be constant around the entire periphery, if a good joint is to be obtained. This condition may be satisfied when the pipes are in perfect alignment, but it is not so when advantage is taken of the possibility of an angular deviation of one pipe relative to the other, since the radial clearance decreases on the inside of the angle or bend and increases a corresponding amount on the outside of this angle. Further, if after assembling, the pipes are not perfectly wedged by packing or other means in the bottom of the trench, movements might occur between the two pipes under the effect of their weight and the weight of the filling earth. Thus this movement could decrease the radial clearance on the inner radius and increase the clearance the same amount on the outer radius of the bend.

Under these conditions, with known joints incorporating sealing elements having thin lips and bodies which are little resistant and are deformable, the elastic material frequently creeps owing to the internal pressure. When this pressure increases and the clearance between the pipes is large, the ring is sometimes expelled.

The object of the present invention is to provide a sealing ring of the aforementioned type having coaxial concentric lips and an anchoring rib so improved as to radically remedy the aforementioned serious disadvantages.

This ring is characterized in that it comprises a massive body extended by two short equally massive lips, the axial width of this body in the free state being substantially equal to three quarters of the total axial width of the ring including the lips, whereas its mean radial thickness is between one half and one third of said axial width of the body.

So constructed, the ring offers a great resistance to the different forces to which it is subjected during and after mounting of the ring. When placed in a socket or bell, this ring stays therein perfectly well without any deformation which might interfere with the introduction of the male end or spigot. It resists creep, even if its massive body is subjected to great radial compression in the course of mounting and if the whole of the ring is subjected after mounting to vary high axial pressure due to the effect of the fluid contained in the pipe. The anchoring bead or rib of the ring has a rigid support or hold on the massive body which maintains it perfectly in position; its short massive lips cannot be rolled or pushed back when assembling the joint although they retain sufficient flexibility to contribute greatly to the sealing effect.

According to another feature of the invention, the body of the ring comprises at the end opposed to the lips at least one conical annular portion converging toward the axis of the ring, so that, when engaged against a complementary face provided on one of the pipes, this conical portion and this complementary face insure an automatic centering of the two pipes.

Thus there is no risk of a relative decentering of the pipes which could have serious consequences, that is, the creation between the two pipes of a large local radial clearance increasing the risk of ring creep.

Owing to the combination of the two characteristics mentioned hereinbefore, there is absolutely no risk of creep.

Another object of the invention is to provide a bell and spigot joint between two pipe elements this joint incorporating the aforementioned improved elastic ring.

Further features and advantages of the invention will be apparent from the ensuing description with reference to the accompanying drawings, to which the invention is in no way restricted.

Figure 1:
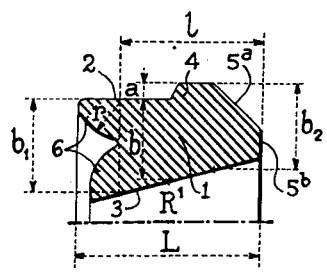
FIG. 1 is a radial axial sectional view of a sealing elementor ring embodying the invention.

In the embodiment shown in FIG. 1, the elastic element or ring $R_1$ has a massive body 1 limited by an outer cylindrical face 2 and a conical inner face 3. Adjacent the major diameter of the conical face 3, the body 1 comprises an outer annular rib 4.

This rib, which is moulded in one piece with the body 1, is connected to the transverse adjacent face $5^b$ of the body by a conical face $5^a$. Adjacent the minor diameter of the conical face 3, the body 1 is extended by two massive, short lips 6 defined, exteriorly, by an outer cylindrical face 2 and an inner conical face 3 and, interiorly, by two curved convex faces which consist of two quarters of a circle interconnected by a very small radius.

L is the overall axial width of the ring in the free state, including its lips 6.

The axial width $l$ of the body 1 is substantially $3L/4$, so that it is substantially equal to three times that of the lips 6.

The radial thickness $b$ of the body is between $L/2$ and $L/3$.

The radial thickness $b_1$ of the base of the lips is substantially equal to the mean thickness $b_2$ in the plane containing the rib 4.

The height $a$ of this rib is about $b/4$ and the side of the rib adjacent the lips 6 being in about the middle of the body 1.

The radius $r$ of the opposing faces of the lips 6 is substantially $b/2$.

Figure 2:
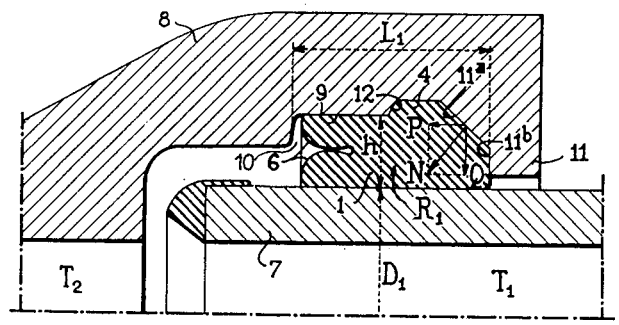
FIG. 2 is an axial view of a joint incorporating said ring.

This ring is composed of fairly flexible rubber having a Shore hardness of 55° to 65° and is suitable for pipes of small diameter not exceeding 300 mm. It is used notably in joints for cast iron pipes of the type shown in FIG. 2.

In this type of joint the male end or spigot 7 of a pipe $T_1$ is plain and has a diameter $D_1$ comprised between the major and minor diameters of the inner conical face 3 of the ring. The socket or bell 8 of the adjoining pipe $T_2$ comprises a recess or housing 9 whose contour corresponds to that of the ring, that is, it has a radial dimension $h$ between the socket and the male and equal to the mean thickness $b$ of the ring and axial width $L_1$ which is slightly greater than the width $L$ of the ring in the free state. The rib 4 is located adjacent the open end of the socket. Adjacent the inner end of the socket the recess 9 is defined by a shoulder 10 and at the other end by an inner flange 11 whose face directed inwardly of the socket comprises a conical portion $11^a$, corresponding to the face $5^a$ of the ring, and a portion $11^b$ which is substantially perpendicular to the axis of the pipe and corresponds to the face $5^d$ of the ring. This flange 11 forms an opening having a diameter slightly greater than $D_1$. Further, the recess 9 comprises, half-way between the shoulder 10 and the flange 11, another shoulder 12 which supports the rib 4 of the ring in cooperation with the flange 11.

The ring $R_1$ is so chosen that the major diameter of its inner conical face 3 is substantially equal, in the free state, to the outside diameter $D_1$ of the pipe $T_1$.

This ring is first engaged in the recess 9 of the socket 8 of the pipe $T_2$ where it is held very well in position owing to the rigidity imparted thereto by its massive body. Thereafter, the male end 7 of the pipe $T_1$ is inserted in the socket 8. As this pipe is moved into the pipe $T_2$, the ring is progressively compressed in the radial direction in the region of the massive body 1 and the tendency to slide forwardly with the pipe $T_1$ is resisted by the forward face of the rib 4 which abuts against the shoulder 12 of the recess 9. In continuing to move the pipe $T_1$ in the socket, the lips 6 are progressively and elastically urged together but their radial compression or contraction is less than that of the body 1, firstly, owing to the space separating the two lips and, secondly, due to the fact that these lips are free to extend in the longitudinal direction owing to the free space between the outer lip and the inner face 10 of the socket. When the joint has been terminated the massive body 1 of the ring is in consequence subjected to a radial compression much greater than that of the lips 6 which therefore conserve greater flexibility and deformability.

When there exists internal pressure in the pipe, this pressure tends to separate these lips, which enhances the fluid-tightness or sealing effect of the joint. Further, the effect of the internal pressure tends to urge the ring $R_1$ toward the entrance of the socket. The latter is held in position in the longitudinal direction by abutment of the end of the ring against the inner end of the recess 9 and of the conical face $5^a$ against the face $11^a$. Owing to the taper of the faces $5^a$ and $11^a$, the supporting reaction N (FIG. 2) has for components: force P, corresponding to the longitudinal thrust parallel with the axis of the pipe, and a force Q, corresponding to radial compression. Thus the greater the internal pressure and in consequence the force with which the ring tends to be expelled, the greater the reaction Q of the radial compression which is added to the normal compression due to penetration of the pipe $T_1$ in the socket 9. Owing to this increased compression of the ring in the part of the body 1 adjacent the entrance of the socket, that is, the part having the greatest thickness, the rubber is compressed in this part much more than in the rest of the ring. In consequence, the latter tends to be better centered in the recess 9 with the result that there is an improved centering of the pipe $T_1$ in the ring. This centering force, which is the greater as the internal pressure is higher, tends to render the annular clearance between the open end of the socket and the male end of the pipe $T_1$ even all around the pipe and in consequence prevents expulsion of the ring which could occur as a result of variation in the clearance around the pipe $T_1$.

Owing to the massive proportions of the body 1 and of the rib 4 and to the function of the centering surfaces $5^a$ and $11^a$ described hereinbefore, the ring cannot be expelled outwardly of the socket by an excess of internal pressure nor inwardly as a result of a suction in the pipes, since it is well engaged with the socket 8. It is moreover impossible to cause it to creep to such an extent that it can pass through the clearance between the flange 11 and the male end 7 or the clearance between the shoulder 10 and the extremity of the male end 7.

Owing to the large axial width of the rib 4, the latter is sturdy and resists shear stresses perfectly well. The lips 6 are also sturdy owing to their massive proportions, although they are flexible and capable of moving apart and together elastically.

Figure 3:
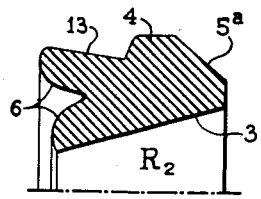
FIGS. 3 and 4 are radial sectional views of modifications of the ring.

In the ring $R_2$ shown in FIG. 3, the outer lip 6 is defined by a conical surface 13 which converges toward the rib 4.

Figure 4:
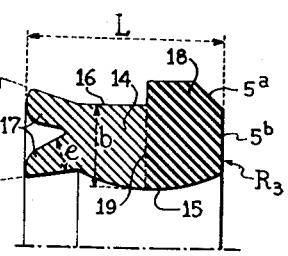

For pipes having small and medium diameters up to about 500 mm., the ring $R_3$ shown in FIG. 4 could be used. This ring comprises a massive body 14 defined by an inner convex or cambered face 15 and an outer cylindrical face 16. At one end the body of the ring is extended by two symmetrically separated lips 17, the included angle $x$ of the slope of the outer faces of the lips being about 10°. The thickness $e$ of the lips 17 is about ⅓ the radial mean thickness $b$ of the ring, this thickness being between $L/2$ and $L/3$, the length of the lips is about $L/4$ as in the first embodiment. At the other end, the body of the ring is provided with an annular rib 18 which is moulded in one piece with this body and protrudes radially outwardly. Preferably, this rib is connected to the lateral face $5^b$ by the conical face $5^a$.

The body of the ring $R_3$ is composed of rubber having two different hardnesses. Adjacent the rib 18, the body is composed of rubber having a Shore hardness of 80° to 85° and, adjacent the lips, the rubber has a Shore hardness of 55° to 65°. The plane 19 of separation of the two types of rubber is located a distance substantially ⅓ of the total axial width of the ring from the lateral face 5$^b$. The two portions of the body are perfectly rigid with one another, this feature being obtained in the course of vulcanization of the ring.

Figure 5:
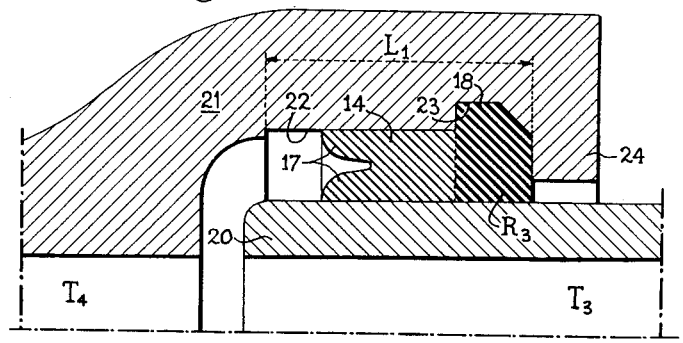
FIG. 5 is an axial sectional view of a joint incorporating the ring shown in FIG. 4.

FIG. 5 shows the joint obtained with the ring R$_3$. In this joint the male end 20 of a pipe T$_3$ is cylindrical and plain and has an outside diameter slightly greater than the inside minimum diameter of the ring. The socket or bell 21 of the adjoining pipe T$_4$ comprises a recess or housing 22 whose diameter is slightly less than the outside diameter of the ring, whereas its axial width L$_1$ exceeds that of the ring.

Adjacent the open end of the socket 21, the recess 22 comprises an annular recess or groove 23 for receiving the rib 18 of the ring, its axial radial sectional shape being substantially similar to that of this rib. The groove 23 is defined by a flange 24 which forms an opening for the male end 20 having a diameter slightly greater than the outside diameter of the pipe T$_5$.

When the ring is placed in position in the recess 22, the male end 20 is introduced in the ring which remains in position in the socket 21. Owing to the hardness of the body adjacent the rib 18, the male end 20 is perfectly centered during its penetration and the rib perfectly resists shear stresses. The body of the ring is moreover highly compressed in the radial direction. The major part of the radial compression is applied to its massive body owing to the convex inner face 15 which flattens. The body slightly elongates and the lips 17 remain in a more free, less compressed, state than in the first embodiment.

Figure 6:
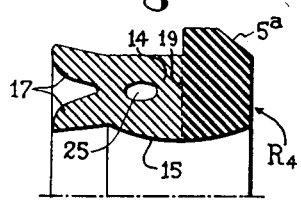
FIG. 6 is a radial sectional view of a modification of the ring shown in FIG. 4.

The ring R$_4$ shown in FIG. 6 comprises between the lips 17 and the plane of separation 19 of the two types of rubber, that is, in the flexible part of the ring, a toric cavity 25 which increases the flexibility of the body and permits increasing, if desired, the convex shape of the face 15.

The types of rings shown in FIGS. 1–6 can be used for pipes of small and medium diameters and notably cast iron pipes or pipes composed of asbestos and cement or other materials the manufacture of which provides a smooth end.

In the case of pipes of larger diameter in which, as mentioned hereinbefore, the sealing rings have a tendency to become oval and flattened under their own weight, the ring is preferably first placed on the male end so as to conserve its circular form.

Figure 7:
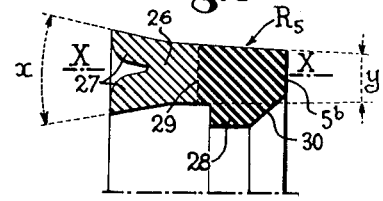
FIG. 7 is a radial sectional view of another modification of the ring of the invention.
Figure 8:
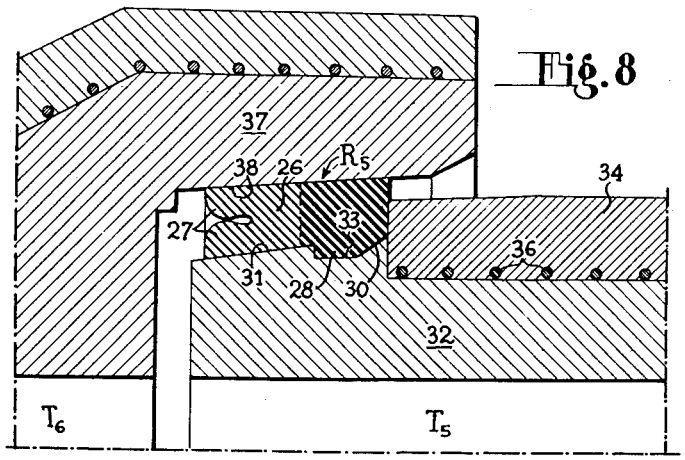
FIG. 8 is an axial sectional view of a joint incorporating the modification of the ring shown in FIG. 7.

Thus the ring R$_5$ shown in FIGS. 7 and 8 comprises a massive body 26 whose radial sectional shape is substantially in the form of an isosceles trapezium having an axis XX parallel with the axis of the ring, the included angle $y$ of the sloping sides of the trapezium being about 3°. Adjacent the large base of the trapezium, the body 26 is extended by two lips 27 which are separated and have the same shape and proportions as those of the rings R$_3$ and R$_4$. On its inner face, the body 26 is provided with an annular rib 28 which is moulded from the same material as the body. This rib has the same shape and proportions as those of the previously described rings, and there is also provided a conical face 30 which connects this rib to the lateral face 5$^b$. Further, as in the case of the previously described rings, the body 26 is composed of rubber having two different hardnesses, the rubber adjacent the rib having a Shore hardness of 80° to 85°, and the rubber adjacent the lips having a Shore hardness of 55° to 65°, the plane of separation 29 being located substantially half-way along the total axial width of the ring.

The ring R$_5$ could be utilized in a joint for concrete pipes of the type shown in FIG. 8. In this arrangement, the male end of a pipe T$_5$ has a smooth conical face 31 formed by the surface of the end of a primary layer 32 of concrete, the included angle of the taper of this conical surface being slightly less than that of the lips 27 in their free state. Adjoining the surface 31 is a groove 33 whose diameter is slightly less than the inside diameter of the ring in the region of its anchoring rib 28.

Placed behind this groove 33, which has a rear conical face corresponding to the face 30 of the ring, is a secondary layer 34 of the pipe T$_5$ adapted to protect the conventional reinforcing binding 36. The thickness of the secondary layer is less than the mean radial thickness of the body of the ring, so that the latter protrudes from the pipe. The socket or bell 37 of the adjoining pipe T$_6$ has a smooth inner conical face 38 which has an included angle substantially equal to that of the surface 31 and converges inwardly of the socket. The radial width of the recess or housing for the ring between the male end of the pipe T$_5$ and the socket 37 is slightly less than the mean radial thickness of the ring in the free state.

The ring R$_5$ is placed in position on the male end of the pipe T$_5$, its rib 28 being engaged in the groove 30. The ring is then under slight tension of about 5% on this male end, which maintains it in the circular form whereas in the free state when it is not mounted on a mandrel or the like, it is liable to collapse and become somewhat oval under the effect of its own weight, since it has a large diameter (greater than 500 mm.).

The joint is formed by introducing the male end of the pipe T$_5$ provided with the ring R$_5$ in the socket 37.

In the course of introducing the male end the latter remains perfectly centered relative to the socket owing to the action of the rib. The outer lip 27 slides along the surface 38 of the socket without being rolled or pushed back owing to its considerable thickness which imparts thereto sufficient rigidity. The lips 27 are moved toward one another owing to their flexibility. The body 26 of the ring is progressively radially compressed and is free to elongate. The pipe T$_5$ is urged into the pipe T$_6$ until the hard end of the ring is in turn compressed and offers in consequence resistance opposing further penetration. The pressure of contact of the ring against the faces of the pipes T$_5$ and T$_6$ is very great and provides perfect sealing.

This last type of ring is more particularly applicable to concrete pipes whose male end could be provided with a non-cylindrical shape in the course of manufacture.

Although specific embodiments of the invention have been described, many modifications or changes may be made therein without departing from the scope of the invention as defined in the appended claim.

Thus, any of the described sealing rings could be composed either of rubber having a single Shore hardness of 55° to 65° or of rubber having two hardnesses, namely, a Shore hardness of 55° to 65° in the lip part and 80° to 85 in the rib part.

Having now described my invention what I claim as new and desire to secure by Letters Patent is:

A sealing ring of elastic material adapted to provide a seal between two pipe line elements, one having a male end and the other a corresponding socket, said ring comprising a massive annular body with solid radial sections adapted to be compressed radially between said two pipe line elements and to resist radial displacements of one of said elements with respect to the other, said body having inner and outer faces and having a radial thickness of about one-third to one-half of its axial width, said body including, on the one hand, at one of its ends two short flange-shaped massive lips which extend from the body and have a substantially quarter-circle-shaped radial section to avoid their bending back towards the other end, said lips having a radial thickness between about one-third and one-half the radial thickness of said body, said body including, on the other hand, at about the middle of its length on one of its faces an axial anchoring rib for engaging the adjacent surface of the corresponding pipe line element, said rib being of substantial axial extent, but of relatively slight radial projection with respect to the associated face of said body and thereby being robust and rigid, and said body including at said other end in relaxed state, a flat transverse shoulder perpendicular to the axis of the ring and having an outer frusto-conical centering end surface which converges in the direction of said other end and which extends from said rib to said transverse shoulder.

References Cited in the file of this patent

UNITED STATES PATENTS

| | | |
|---|---|---|
| 2,116,705 | Marx et al. | May 10, 1938 |
| 2,230,725 | Nathan | Feb. 4, 1941 |
| 2,259,940 | Nathan | Oct. 21, 1941 |
| 2,314,386 | Brend | Mar. 23, 1943 |
| 2,451,070 | Chamberlain | Oct. 12, 1948 |
| 2,572,419 | Wyss | Oct. 23, 1951 |